United States Patent Office 3,369,009
Patented Feb. 13, 1968

3,369,009
AZIDOFORMATE-CONTAINING COPOLYMERS
Norman C. MacArthur, Avondale, Pa., assignor to
Hercules Incorporated, a corporation of Delaware
No Drawing. Filed Dec. 10, 1964, Ser. No. 417,512
11 Claims. (Cl. 260—80.81)

ABSTRACT OF THE DISCLOSURE

Copolymers of ethylenically unsaturated azidoformates and at least one other copolymerizable monomer are described. The copolymers, and particularly the copolymers of the monoazidoformate of 2-hydroxyethyl methacrylate or of the triallyl ether of pentaerythritol and ethyl acrylate, methyl methacrylate, butyl methacrylate and/or α-methylstyrene are useful as film-forming ingredients in coating compositions wherein, on curing at above the decomposition temperature of the azidoformate, they cross-link to impart strength and hardness to films thereof. The copolymers are produced by polymerizing a mixture of the azidoformate and comonomer(s) in the presence of redox catalysts or free radical initiators.

---

This invention relates to copolymers containing pendant azidoformate groups and more particularly to copolymers of a polymerizable azidoformate and at least one other ethylenically unsaturated monomer, and to their use in coating compositions.

The copolymers of this invention are copolymers of an azidoformate having the formula

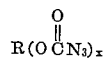

where R is an organic radical containing at least one polymerizable vinylidene group and $x$ is a number from 1 to 5 and preferably from 1 to 3, and at least one other ethylenically unsaturated monomer. Preferred radicals which R can comprise include vinylalkyl such as allyl and 3-butenyl, vinylaryl such as vinylphenyl and radicals of the formula $$(R'O)_nZ$$

where R' is a radical selected from the group consisting of vinyl, allyl, acrylyl and methacrylyl radicals, Z is the inert residue of a saturated aliphatic alcohol having a minimum functionality of 2 and $n$ is the functionality of Z minus $x$ where $x$ is as above and $n$ is at least 1. Preferred alcohols from which Z can be derived include the dihydric alcohols such as ethylene glycol and hexamethylene glycol, trihydric alcohols such as glycerol and trimethylol propane, tetrahydric alcohols such as pentaerythritol, and the like.

The ethylenically unsaturated monomer which forms the other component of the copolymers of this invention can be any monomer or mixture of monomers which is copolymerizable with the azidoformate at a temperature below the decomposition point of the azidoformate. Thus, compounds containing at least one vinyl, vinylidene or vinylene group ordinarily can be copolymerized with the azidoformate. Suitable monomers include, for example, olefins such as ethylene, trichloroethylene, 1,2-dichloropropene-2, vinyl nitriles such as acrylonitrile and methacrylonitrile, vinyl esters such as vinyl acetate, vinyl carbazole, vinyl chloride, vinylidene chloride, allyl acetate, allyl chloride, allyl chloroacetate, methallyl acetate, methallyl chloride, isopropenyl acetate, diolefins such as butadiene and chloroprene, alkenylaryls such as styrene, the methylstyrenes, o-, m-, or p-chlorostyrene, 2,5-dichlorostyrene, pentachlorostyrene, m- or p-bromostyrene, p-iodostyrene, p-cyanostyrene, p-methoxystyrene, p-dimethyl aminostyrene, diethyl fumarate, diethyl maleate, maleic anhydride, the alkyl acrylates such as methyl acrylate and the higher alkyl esters, isobornyl acrylate, the α-chloroacrylates such as methyl α-chloroacrylate and the higher alkyl esters, β-chloroethyl acrylate, the methacrylates such as methyl methacrylate and the higher alkyl esters, isobornyl methacrylate, methyl vinyl ketone, 2-vinylpyridine, and the like.

The copolymers of the invention can be prepared in a range of molecular weights ranging from low to high by polymerizing a mixture of the azidoformate and the monomers under conditions which do not destroy the azidoformate grouping using conventional redox catalysts such as cobalt-cyclohexanone peroxide and iron-benzoin-triethylamine-cumene hydroperoxide, or such free radical initiators as acetyl peroxide, azobisisobutyronitrile, benzoyl peroxide and the like, and preferably at between room temperature and about 100° C.

The azidoformates from which the copolymers of this invention are produced can be prepared in various ways as, for example, by reacting a compound containing one polymerizable vinylidene group and at least one reactive hydroxyl group with phosgene and then reacting the chloroformate so formed with an excess, i.e., from about 1.05 moles to about 10 moles per equivalent of chloroformate of an alkali azide. These reactions can be shown by the following equations:

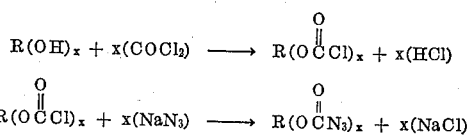

where R and $x$ are as defined above.

Exemplary of compounds containing one polymerizable vinylidene group and at least one reactive hydroxyl group which can be used to form the azidoformate monomers are allyl alcohol, hydroxyalkyl acrylates such as hydroxyethyl acrylate, hydroxypropyl acrylate and the like, hydroxyalkyl methacrylates such as hydroxyethyl methacrylate, hydroxypropyl methacrylate and the like, the monovinyl ethers of glycols such as ethylene glycol monovinyl ether, propylene glycol monovinyl ether, butanediol monovinyl ether, diethylene glycol monovinyl ether and hexylene glycol monovinyl ether, the allyl ethers of glycols such as the allyl ether of ethylene glycol, the allyl ether of propylene glycol, the allyl ether of butanediol, the allyl ether of butenediol and the allyl ether of hexylene glycol, the monoallyl ether of glycerine, the monoallyl ether of trimethylol alkanes such as the monoallyl ether of trimethylol ethane, the monoallyl ether of trimethylolpropane, the monoallyl ether of pentaerythritol, the monoacetal of acrolein and pentaerythritol such as 2-vinyl-5,5-bis(hydroxymethyl)1,3-dioxane, the o-, m-, and p-hydroxystyrenes, ring substituted derivatives of the hydroxystyrenes, and the like. The diallyl ethers of trihydric alcohols such as glycerine, trimethylolethane and trimethylolpropane, mixtures thereof with the corresponding monoallyl ethers and the di- and tri-allyl ethers of pentaerythritol as well as mixtures thereof with each other and with the monoallyl ethers are also suitable.

Before describing the invention in greater detail, the following examples are presented to illustrate the preparation of the new azidoformate copolymers. All parts and percentages are by weight unless otherwise specified. The molecular weight of the polymers is shown by the Reduced Specific Viscosity (RSV). By the term "Reduced Specific Viscosity" is meant the $\eta_{sp}/C$ determined on a 0.1% solution of the polymer in a given solvent at a given temperature.

The azidoformate used in Examples 1 to 3 was prepared from a chloroformate produced by adding dropwise 325 parts of 2-hydroxyethyl methacrylate to a slurry of 346 parts of phosgene and 140 parts of calcium carbonate in 668 parts of methylene chloride maintained at $-10°$ C., by agitating the mixture for 1.5 hours at $0°$ C., and by collecting the chloroformate product. This chloroformate product was next dissolved in 1000 parts of methylene chloride and was added dropwise with agitation to a slurry of 192 parts of sodium azide in 500 parts of water. The mixture was agitated for 45 hours at room temperature after which the methylene chloride layer was separated, washed with water and dried. The monoazidoformate of 2-hydroxyethyl methacrylate was then isolated by removing the methylene chloride under vacuum.

The monoazidoformate of the triallyl ether of pentaerythritol used in Example 4 was prepared from the corresponding chloroformate in the same manner as above except that 384 parts of commercial triallyl ether of pentaerythritol having an average degree of substitution greater than about 2.8, 223 parts of phosgene, 100 parts of calcium carbonate and 400 parts of methylene chloride were used to form the chloroformate and the mixture was agitated for 3.5 hours. A solution containing 440 parts of the chloroformate of the triallyl ether of penetaerythritol in 400 parts of methylene chloride was then added dropwise to a slurry of 216 parts of sodium azide in 400 parts of water. The mixture was agitated vigorously at room temperature for 3 days, and then was refluxed for 5 hours, after which the product was isolated as above.

Example 1

Into a reaction vessel charged with

| | Parts by weight |
|---|---|
| α-methylstyrene | 78 |
| Ethyl acrylate | 21 |
| Azidoformate of 2-hydroxyethyl methacrylate (dissolved in methylene dichloride) | 5 |
| Water | 200 |
| Sodium lauryl sulfate | 6 |
| $FeSO_4 \cdot 7H_2O$ | 0.020 |
| Sodium ethylenediamine tetraacetate | 0.029 |
| Sodium formaldehyde sulfoxylate | 0.36 |
| Tert-dodecyl mercaptan | 0.1 | and flushed 3 times with nitrogen, there was injected 0.13 part by volume of a 56% solution of p-menthane hydroperoxide. The mixture was agitated at $25°$ C. for 3 hours under nitrogen, and then was shortstopped by adding 9 parts of a 3% solution of 2,5-di-tert-amylhydroquinone in benzene. The polymeric latex was coagulated by adding it dropwise to 10 volumes of methanol, and then the coagulum was collected and was dissolved in sufficient toluene to give approximately 10% solids. The solution was filtered and the filtrate was added to 10 volumes of methanol to reprecipitate the polymer. The product was collected and air-dried for 72 hours. The terpolymer product weighed 31 grams, contained 1.2% nitrogen and had a reduced specific viscosity measured as a 0.1% solution in ethylene dichloride at $25°$ C. of 1.2.

Example 2

A polymerization vessel was charged with

| | Parts by weight |
|---|---|
| Methyl methacrylate | 16.9 |
| Ethyl acrylate | 33.2 |
| Azidoformate of 2-hydroxyethyl methacrylate (dissolved in 2.6 parts ethylene dichloride) | 0.25 |
| Water | 100 |
| Sodium lauryl sulfate | 2.25 |
| $FeSO_4 \cdot 7H_2O$ | 0.010 |
| Sodium ethylenediamine tetraacetate | 0.015 |
| Sodium formaldehyde sulfoxylate | 0.018 | and the vessel was flushed with nitrogen 3 times, and then was tumbled at room temperature for 30 minutes. The polymerization was initiated by injecting 1 part by volume of a solution containing 0.8 volume of 56% p-methane hydroperoxide and 9.2 volumes of hexane, and the vessel was tumbled for 3 hours at room temperature. The polymerization mixture was then stripped for ¾ to 1 hour at $25°$ C. under vacuum to remove excess diluent and unreacted monomer. The terpolymer was obtained in greater than 95% conversion (total solids basis) and had a reduced specific viscosity measured on a 0.1% solution in ethylene dichloride at $25°$ C. of 15.5.

Example 3

A polymerization vessel was charged with

| | Parts by weight |
|---|---|
| Isobornyl acrylate | 60 |
| 2-ethylhexyl acrylate | 25 |
| Azidoformate of 2-hydroxyethyl methacrylate (dissolved in 103 parts ethylene dichloride) | 10 |
| Xylene | 110 |
| Benzoyl peroxide | 0.5 | and was flushed with nitrogen 3 times, and the contents heated at $80°$ C. with agitation for 3 hours and then cooled overnight. The polymer product was precipitated from the reaction mixture by adding it dropwise to 10 volumes of methanol with agitation. The polymer was collected and then was dried to give a terpolymer product having a reduced specific viscosity measured in ethylene dichloride at $25°$ C. of 0.18 and containing 1.57% nitrogen (calculated 2.14%).

Example 4

A polymerization tube was charged with 10 parts of butyl methacrylate, 0.5 part of the azidoformate of the triallyl ether of pentaerythritol (dissolved in 1.6 parts ethylene dichloride), 20 parts of benzene and 0.03 part of α,α'-azo-bis-(isobutyronitrile). A magnetic stirring bar was inserted into the tube and the tube was closed and was flushed 3 times with nitrogen. The charge was then heated with stirring and maintained at $65°$ C. for 4 hours. Total solids determination based on the cooled solution indicated 50% conversion to copolymer. The isolated product, a copolymer of butyl methacrylate and the azidoformate of the triallyl ether of pentaerythritol, had a reduced specific viscosity of 0.3 determined in ethylene dichloride at $25°$ C. and contained 0.3% nitrogen.

As was mentioned above, the copolymers of this invention are of particular usefulness in coating compositions. Simply by curing a composition containing as the film-forming ingredient the azidoformate copolymer or a blend of the azidoformate copolymer with another polymer at a temperature high enough to initiate decomposition of the azide at a practical rate, it is possible to produce infusible, insoluble compositions which are particularly useful as coatings.

The following examples are presented to illustrate the use of the copolymers of this invention with themselves and with other polymers as coatings. All parts and percentages are by weight unless otherwise specified.

Example 5

Coatings were cast from a 20% xylene solution of the terpolymer of the azidoformate of 2-hydroxyethyl methacrylate, α-methylstyrene and ethyl acrylate prepared in Example 1 onto 4 x 6-inch bonderized steel panels using a 20-mil blade, were air-dried for 15 minutes, and then were baked for 1 hour at 149° C. The coating, 1.4 mils thick, had a Sward hardness of 40, was essentially insoluble in xylene. A similar coating of a control polymer of α-methylstyrene and ethyl acrylate, prepared as in Example 1 except that the azidoformate was omitted, dissolved readily in xylene.

Example 6

One hundred fifty parts of a 40% solution of the terpolymer of the azidoformate of 2-hydroxyethyl methacrylate, α-methylstyrene and ethyl acrylate prepared in Example 1 was ball-milled with 48 parts of rutile ($TiO_2$) for 24 hours, and then was reduced to about 55% solids with 86 parts of a 1:1 xylene-toluene mixture to give a coating formulation having a No. 4 Ford cup viscosity of 23 seconds. The above formulation was cast on bonderized steel panels with a 5-mil knife, and then was cured for 30 minutes at 150° C. to give a hard, glossy, solvent-resistant coating 1 mil thick.

Example 7

The coating solution of Example 5 was cast with a 3-mil blade onto a portion of a 5 x 5 x ⅛-inch polypropylene plaque which had been solvent treated by subjecting the surface to be coated to the hot vapors of refluxing trichloroethylene for about 5 seconds. Another portion of the same plaque was similarly coated except that a solution of the control polymer of Example 5 was used instead of the terpolymer. The plaque was baked for 1 hour at 150° C. and the adhesion of the coatings to the plaque was evaluated by crosshatching a 1-square-inch area of the surface of the coating with razor blade cuts 1/16 inch apart and at right angles to each other, applying a strip of conventional transparent pressure-sensitive "cellophane" tape over the crosshatched area with sufficient pressure to assure complete adhesion, jerking the tape from the surface, and observing what part, if any, of the coating was removed by the tape. None of the coating of the terpolymer of the azidoformate of 2-hydroxyethyl methacrylate, α-methylstyrene and ethyl acrylate was removed from the plaque by the tape when tested immediately after removal from the oven, warm or at room temperature, whereas about 90% of the coating of control polymer of α-methylstyrene and ethyl acrylate was stripped from the plaque when tested hot from the oven, about 10 to 20% removed when warm and a slight amount was removed at room temperature.

Example 8

A sample of the latex of the terpolymer of the azidoformate of 2-hydroxyethyl methacrylate, methyl acrylate and ethyl acrylate prepared in Example 2 was cast on glass and was baked at 150° C. for 30 minutes. The coating was insoluble in xylene, and had a Sward hardness of 14.

Example 9

A 40% xylene solution of the terpolymer of the azidoformate of 2-hydroxyethyl methacrylate, isobornyl acrylate, and 2-ethylhexyl acrylate prepared in Example 3 was applied to untreated polypropylene plaques by roller coating, and the coated plaques were baked for 30 minutes at 150° C. The resulting hard, clear coating had excellent adhesion to the plaque and was no longer soluble in xylene. By comparison, a control coating prepared in the same manner from a copolymer of isobornyl acrylate and 2-ethylhexyl acrylate, but no azidoformate, was readily dissolved by xylene.

Example 10

The solution of the copolymer of the azidoformate of the triallyl ether of pentaerythritol and butyl methacrylate prepared in Example 4 was applied to an untreated injection molded plaque of polypropylene by roller coating and the coated plaque air-dried and then baked for 30 minutes at 120° C. to give a 0.2 to 0.3 mil coating. The coating was hard and was insoluble in xylene after 1 hour's immersion. Coatings cast from this same solution onto glass and baked for 30 minutes at 120° C. were likewise hard and insoluble in xylene.

As can be seen from the above examples, the azidoformate copolymers can be cross-linked to impart strength and hardness to films thereof and also that the copolymers have particular utility in the coatings field. The cross-linking process can be carried out by heating the copolymers of this invention to a temperature at which decomposition occurs at a practical rate. This temperature varies over a wide range, but, in general, will be in the range from about 100° C. to about 225° C.

Other ingredients can also be incorporated into the copolymers, as, for example, extenders, fillers, pigments, plasticizers, stabilizers, etc., as well as minor amounts of other polymeric materials which in combination with the azidoformate copolymers cure to solvent-resistant products. Particularly useful in this respect are the rubbers such as, for example, the rubbery copolymers of α-methylstyrene and 2-ethylhexyl acrylate, which, in amounts up to about 15%, act as flexibilizing agents or plasticizers for the azidoformate copolymers without detracting from the other desired properties of the film.

The following examples illustrate the use of the terpolymer of α-methylstyrene, ethyl acrylate and the azidoformate of 2-hydroxyethyl methacrylate with minor amounts of a rubbery copolymer of α-methylstyrene and 2-ethylhexyl acrylate to produce insoluble flexible coatings.

Examples 11–15

One hundred fifty-one parts (40% solids) of a 40% toluene solution of the terpolymer of α-methylstyrene, ethyl acrylate and the azidoformate of 2-hydroxyethyl methacrylate prepared in Example 1, 48 parts of rutile $TiO_2$ and 200 parts of porcelain pebbles were charged to a ball mill and rolled for 20 hours to give a pigmented terpolymer having a Hegman fineness of grind value of 8. The ground terpolymer was next reduced to 50% solids with xylene and portions thereof plasticized with from 0 to 20% (solids basis), by weight of the terpolymer solids, of a rubbery copolymer of α-methylstyrene and 2-ethylhexyl acrylate. Each of the plasticized portions was knife cast onto phosphated steel panels to give 0.9 mil coatings. The coatings were baked for 30 minutes at 150° C., were quenched, and then were evaluated for hardness, flexibility and solvent resistance. The rubbery copolymer used as a plasticizer in these examples was prepared by polymerizing a charge consisting of 69 parts of α-methylstyrene, 131 parts of 2-ethylhexyl acrylate, 400 parts of water, 12 parts of sodium lauryl sulfate, 0.04 part of $FeSO_4 \cdot 7H_2O$, 0.06 part of sodium ethylene diamine tetraacetate and 2.4 parts of tert-dodecyl mercaptan under nitrogen for 4 hours at 25° C. using 0.24 part by volume of 56% p-menthane hydroperoxide as initiator. The latex so obtained was coagulated by adding it dropwise to 10 volumes of stirred methanol. The coagulated polymer was redissolved in toluene to give a 15% solution, the polymer reprecipitated by adding the solution to 10 volumes of stirred methanol, and the soft tacky polymer product was air-dried for 72 hours. The air-dried polymer was then made up into a 40% solution with toluene.

Details of these examples and properties of the cured coatings are recorded in Table I following.

TABLE I

| Example No. | Percent Rubbery Copolymer | Properties of Coating after Curing ||| Remarks |
|---|---|---|---|---|---|
| | | Sward Hardness | Elongation [1] | Toluene Resistance [2] | |
| 11 | 0 | 50 | Failed <5% | No effect | Nontacky. |
| 12 | 5 | 38 | Passed 25% | ----do---- | Do. |
| 13 | 10 | 38 | ----do---- | ----do---- | Do. |
| 14 | 15 | 36 | ----do---- | ----do---- | Do. |
| 15 | 20 | 34 | Passed 30% | ----do---- | Slightly tacky. |

[1] Determined in accordance with ASTM D522-60.
[2] After immersion for 24 hours at room temperature.

What I claim and desire to protect by Letters Patent is:

1. A copolymer of an azidoformate having the formula

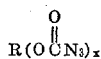

where R is an organic radical containing at least one polymerizable vinylidene group and $x$ is a number from 1 to 5, and at least one other ethylenically unsaturated monomer.

2. The copolymer of claim 1 wherein the azidoformate is the monoazidoformate of 2-hydroxyethyl methacrylate.

3. The copolymer of claim 1 wherein the azidoformate is the monoazidoformate of the triallyl ether of pentaerythritol.

4. A copolymer of an azidoformate having the formula

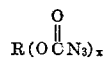

where R is an organic radical containing at least one polymerizable vinylidene group and $x$ is a number from 1 to 5, and at least one other ethylenically unsaturated monomer selected from the group consisting of ethyl acrylate, 2-ethylhexyl acrylate, isobornyl acrylate, methyl methacrylate, butyl methacrylate and α-methylstyrene.

5. The copolymer of claim 4 wherein the azidoformate is the monoazidoformate of 2-hydroxyethyl methacrylate.

6. The copolymer of claim 4 wherein the azidoformate is the monoazidoformate of the triallyl ether of pentaerythritol.

7. A terpolymer of the monoazidoformate of 2-hydroxyethyl methacrylate, α-methylstyrene and ethyl acrylate.

8. A terpolymer of the monoazidoformate of 2-hydroxyethyl methacrylate, methyl methacrylate and ethyl acrylate.

9. A terpolymer of the monoazidoformate of 2-hydroxyethyl methacrylate, isobornyl acrylate and 2-ethylhexyl acrylate.

10. A copolymer of the monoazidoformate of the triallyl ether of pentaerythritol and butyl methacrylate.

11. A coating composition comprising a diluent and, as the essential film-forming ingredient, one of the copolymers of claim 4.

No references cited.

JOSEPH L. SCHOFER, *Primary Examiner.*

S. M. LEVIN, *Assistant Examiner.*